United States Patent [19]

Ellithorpe et al.

[11] 4,203,625
[45] May 20, 1980

[54] APPARATUS FOR SULFUR MELTING BY LATERAL DISPLACEMENT OF HEATING ELEMENT

[75] Inventors: Ernest R. Ellithorpe; Richard C. Ellithorpe, both of Calgary, Canada

[73] Assignee: Western Sulfur Remelters Ltd., Calgary, Canada

[21] Appl. No.: 906,197

[22] Filed: May 15, 1978

[30] Foreign Application Priority Data

May 17, 1977 [GB] United Kingdom ............... 20629/77

[51] Int. Cl.² .............................................. E21C 41/14
[52] U.S. Cl. ...................................... 299/6; 173/147; 299/14
[58] Field of Search ....................... 299/6, 14; 173/147

[56] References Cited

U.S. PATENT DOCUMENTS

| 213,789 | 4/1879 | DuMotay et al. ................... 299/6 X |
| 1,614,216 | 1/1927 | Swartz ............................. 173/147 X |
| 2,030,981 | 2/1936 | Gartin ............................. 173/147 X |
| 3,788,703 | 4/1972 | Thorpe ................................... 299/14 |
| 4,050,740 | 9/1977 | Ellithorpe et al. ....................... 299/6 |

FOREIGN PATENT DOCUMENTS 1040037  10/1978  Canada .

OTHER PUBLICATIONS

Schwab & Duecker, "High Capacity Attained by New Sulphur Melter", Chem. & Met. Engr., Aug. 1937, pp. 441 & 442.

*Primary Examiner*—Ernest R. Purser
*Attorney, Agent, or Firm*—Fleit & Jacobson

[57] ABSTRACT

An apparatus and a method for melting block sulphur employ a heating element pivotally mounted on a carriage on a trailer. The heating element is pivoted from a collapsed, transport position to an upright position, and a counterweight force is applied to the carriage to advance the heating element in a direction at least approximately parallel to the ground towards the sulphur.

20 Claims, 11 Drawing Figures

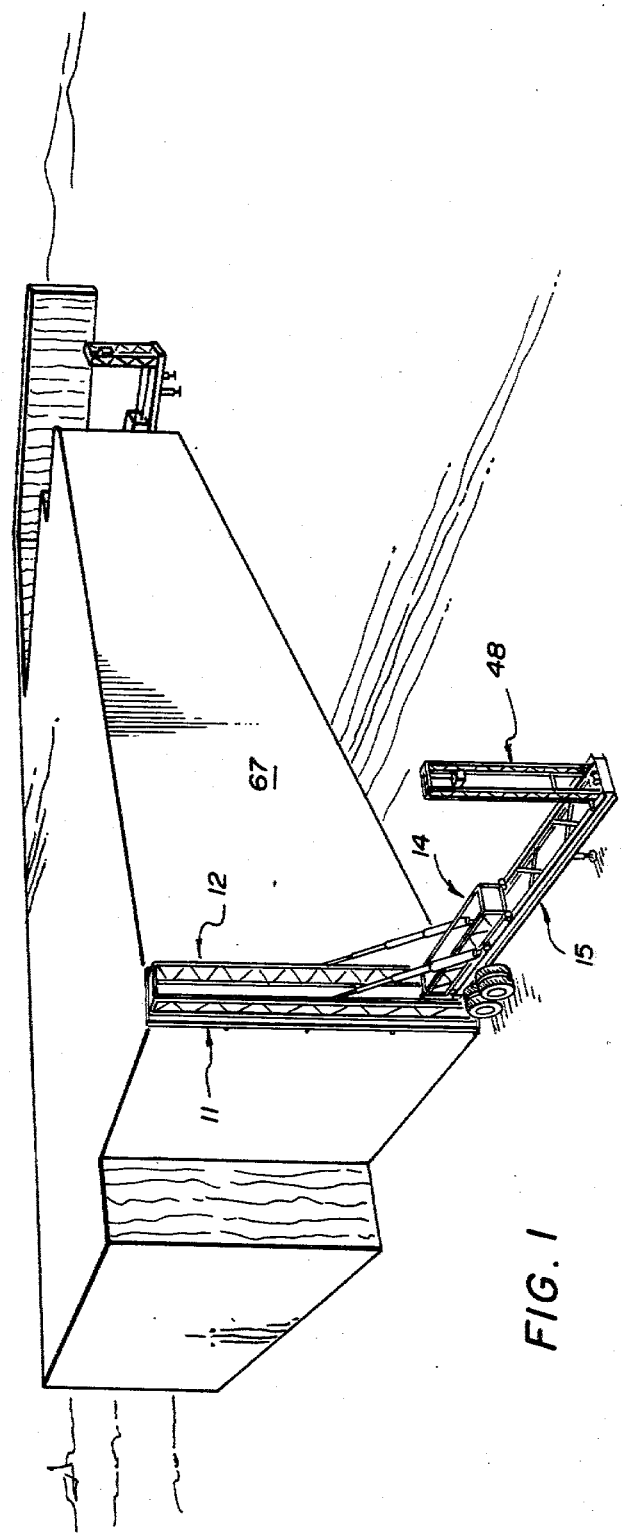

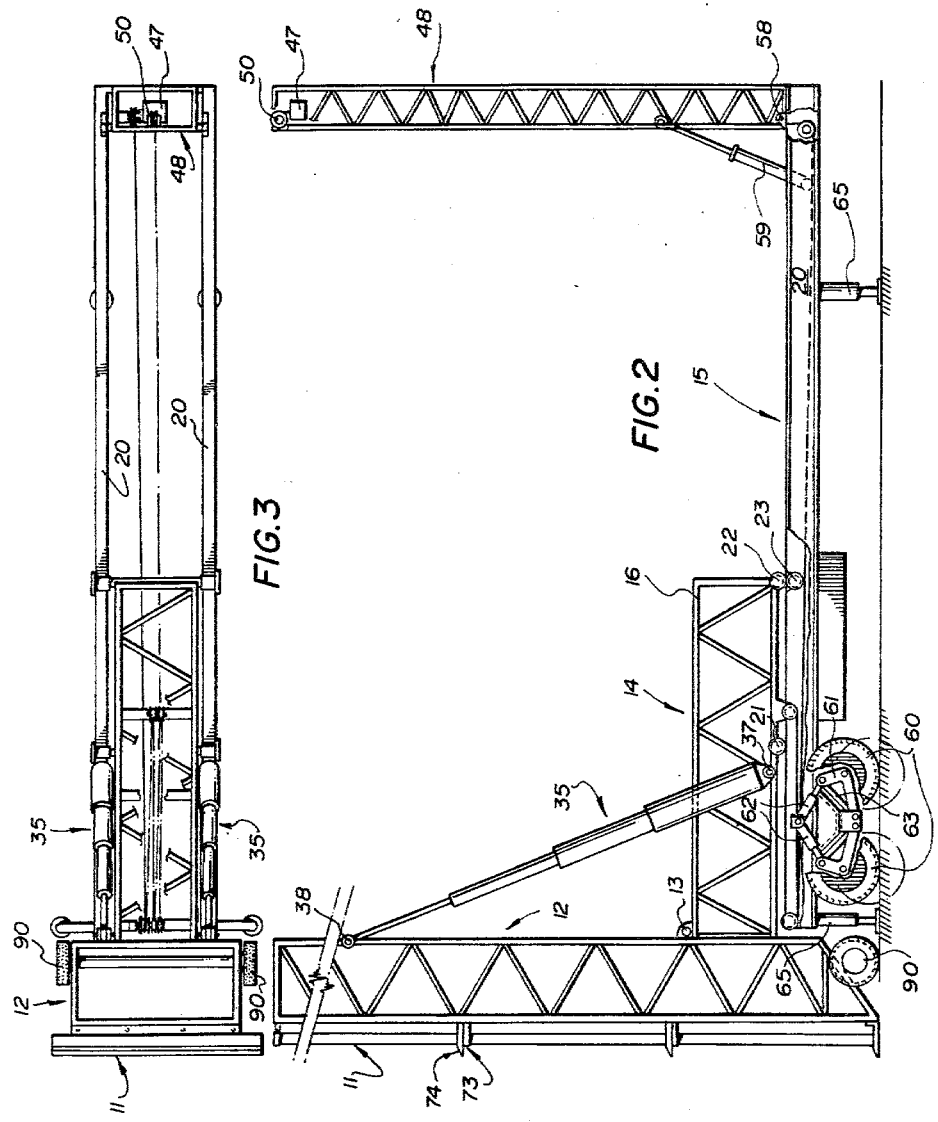

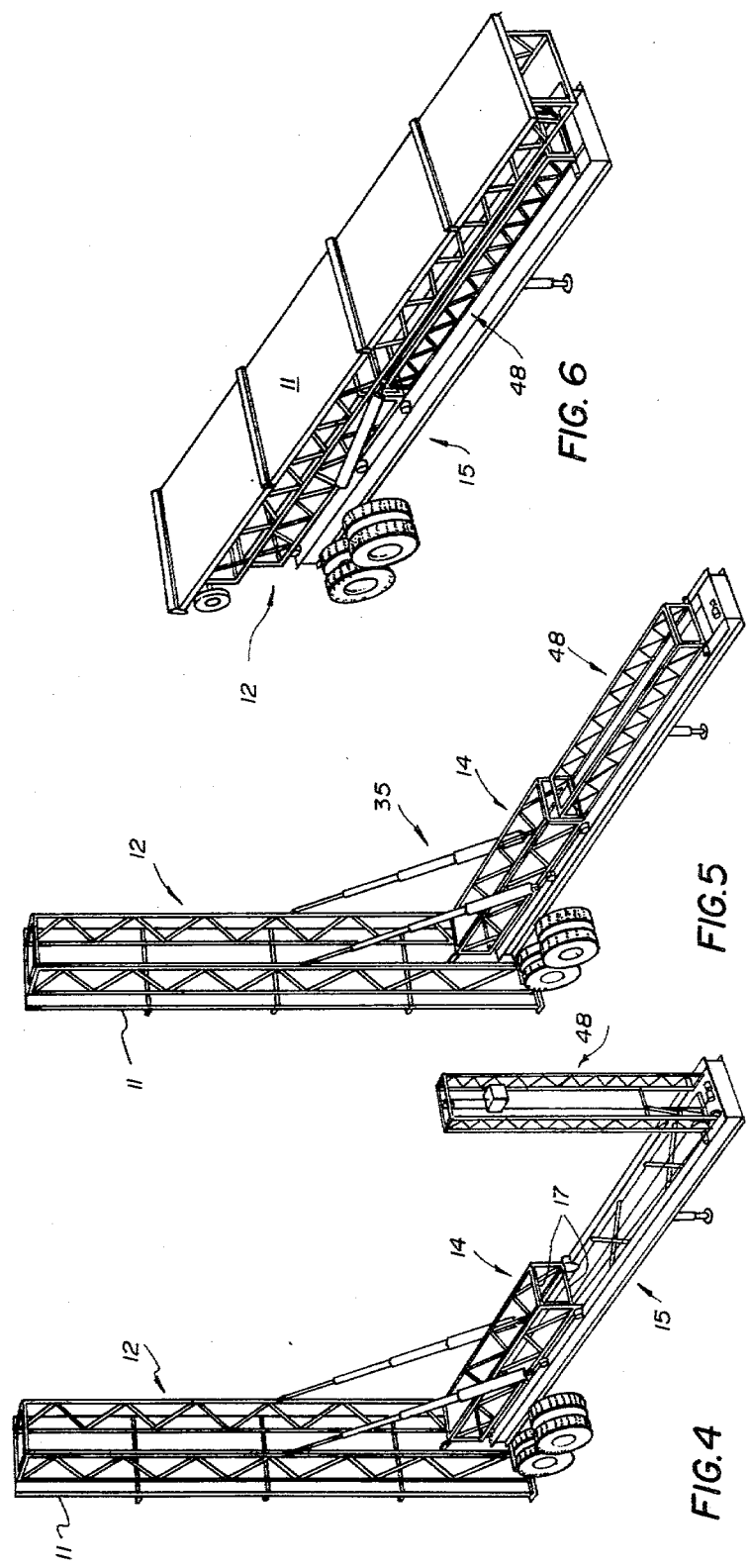

APPARATUS FOR SULFUR MELTING BY LATERAL DISPLACEMENT OF HEATING ELEMENT

FIELD OF THE INVENTION

The present invention relates to methods and apparatus for melting block sulphur.

The large amounts of sulphur which are produced as a by-product during the extraction of natural gas from the earth are normally stored in large blocks close to the points at which the extraction of the natural gas occurs.

Problems subsequently arise when it is desired to remove the sulphur from the sulphur blocks for transportation, for example, to remote markets. These problems arise from the difficulty involved in breaking up the large sulphur blocks into amounts of sulphur which are sufficiently small to be conveniently transported, and without polluting the surroundings.

PRIOR ART

Hitherto, it has been common practice to employ explosives or mechanical means for physically breaking up the sulphur blocks to convert the block sulphur to sulphur lumps or powder or flake form. However, this prior practice has the very considerable disadvantage that it causes severe pollution of the surrounding environment by the considerable quantity of sulphur dust, which is necessarily produced by the breaking up of the sulphur block. This pollution of the surrounding environment, apart from being esthetically undesirable, may also constitute a dangerous hazard to health.

Accordingly, in recent years, efforts have been made to melt successive portions or sections of the sulphur blocks in order to thus enable the sulphur to be removed from the blocks in liquid form. The liquid sulphur thus obtained from the blocks is subsequently re-solidified in a form more convenient for transportation.

For example, in U.S. Pat. No. 4,050,740, issued Sept. 27, 1977, there is disclosed an apparatus for and a method of melting block sulphur in which a heating element defining a plurality of flow passages in a generally planar array is provided for melting the block sulphur, the heating element being suspended at an inclination and downwardly inclined towards one edge thereof, and a flow surface being provided at the underside of the heating element for flowing molten sulphur by surface tension along the underside of the heating element into a trough, which collects the molten sulphur beneath the flow surface.

This prior method and apparatus has the advantage that successive portions of the sulphur block can be melted without leaving any solid wall of unmelted sulphur between the spaces left by the melting of these sulphur block portions.

BRIEF SUMMARY OF THE INVENTION

According to the present invention, apparatus for melting of block sulphur comprises a heating element for applying heat to the sulphur, means for supporting the heating element in an at least approximately upright disposition, and means for advancing the heating element in such disposition and in a direction at least approximately parallel to the ground towards the sulphur.

In a preferred embodiment of the invention, the heating element is carried by a carriage, which in turn is movable along rails provided on a trailer. The heating element is pivotally connected to the carriage for pivotal movement about a horizontal axis between a collapsed, horizontal position, in which the heating element is transported by the trailer, and an erected, operational position, in which the heating element is in its upright disposition.

The means for advancing the heating element towards the sulphur preferably comprise a counterweight arranged to exert a biasing force on the heating element. Such employment of a counterweight has the advantage, as compared to the use of hydraulic piston and cylinder devices or winches for advancing a heating element, that when the heating element encounters foreign objects in the block, which impedes its advance, undesirable forces which might damage the apparatus are not exerted on the apparatus due to the obstruction of the heating element advance.

BRIEF DESCRIPTION OF THE DRAWINGS

The invention will be more readily understood from the following description of a preferred embodiment thereof given, by way of example, with reference to the accompanying drawings, in which:

FIG. 1 shows a view in perspective of a block sulphur melting apparatus embodying the present invention and in use adjacent a block of sulphur;

FIG. 2 shows a view taken in side elevation of the block sulphur melting apparatus illustrated in FIG. 1;

FIG. 3 shows a plan view of the block sulphur melting apparatus of FIG. 2;

FIGS. 4 to 6 show views of the apparatus of FIG. 1 in perspective in an erected position, a semi-collapsed condition and a fully collapsed condition, respectively;

Figure 7:
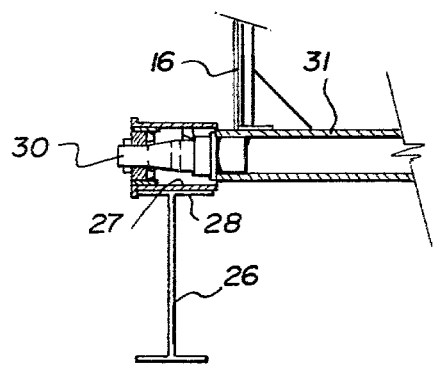
FIGS. 7 and 8 show broken-away views taken in cross-section through rollers of the carriage of the apparatus shown in FIG. 2.

The block sulphur melting apparatus illustrated in the drawings comprises an elongate rectangular melter or heating element 11 which, in the position in which it is illustrated in FIGS. 1 to 5, is shown in an erected, at least approximately upright disposition.

The heating element 11 is supported at the rear side of a support tower indicated generally by reference numeral 12, which is in the form of a framework, and the support tower 12 is pivotally supported by means of pivot connections 13 (FIG. 2) on the rear end of a subframe or carriage, which is indicated generally by reference numeral 14.

The subframe or carriage 14 is movably supported, as will be described in greater detail hereinafter, on the rear end of the chassis of a mobile platform or trailer indicated generally by reference numeral 15, and is extensible and retractable, in the longitudinal direction of the trailer 15 and to and from the rear end of the trailer 15, between the retracted position, in which the carriage 14 is shown in FIGS. 1 to 6, and an extended position, in which the carriage 14 is cantilevered outwardly beyond the rear end of the trailer 15.

More particularly, the carriage 14 comprises opposed longitudinal vertical side walls 16 in the form of rectangular lattice frames, which are connected at the corners thereof by transverse members 17, the pivot connections 13 being provided at the rearmost uppermost corners of the side walls 16. Alternatively, the side walls 16 may be connected to one another by lattice structures.

The carriage 14 is movably supported on a track formed by a pair of parallel rails which are indicated generally by reference numeral 20 and which extend longitudinally of the trailer 15. Each of the side walls 16 is provided with three rollers 21 to 23 co-operating with the respective rail 20.

Figure 8:
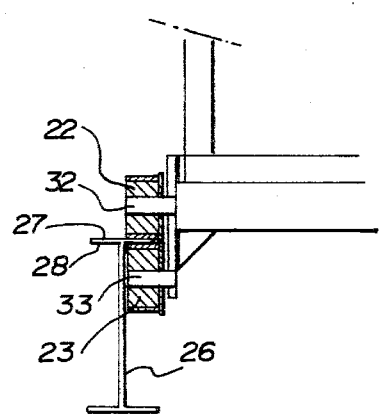

As can be seen more clearly from FIGS. 7 and 8, each rail 20 comprises an I-beam 26 having an upper flange providing at its top an upper running surface 27 and at its underside a lower running surface 28.

The roller 21, which is shown in FIG. 7, rollingly engages the upper running surface 27, and is rotatable on a journal 30 projecting from one end of a tubular member 31 extending transversely of the carriage 14.

FIG. 8 shows the rollers 22 and 23 and, as will be seen, these rollers comprise a vertically spaced pair of rollers in rolling engagement with the upper and lower rolling surfaces 27 and 28, respectively. The rollers 22 and 23 are rotatably journalled on respective stub shafts 32 and 33 projecting laterally from the carriage 14 at the lower, front corner thereof.

Since the rollers 21 as shown in FIGS. 2 and 3, are located approximately one-third of the length of the carriage 14 from the front end of the latter at which the rollers 22 and 23 are provided, the arrangement of the rollers 21 to 23 and the two I-beams 26 enables the carriage 14 to be cantilevered rearwardly from the rear end of the trailer 15 while remaining in its horizontal position, i.e. without tilting at the rear of the trailer 15.

At each side of the carriage 14, there is provided a lifting mechanism in the form of a hydraulic ram, indicated generally by reference numeral 35, for pivotally raising the heating element support tower 12, and therewith the heating element 11, about the horizontal common axis of pivotation of the pivotal connections 13 into the erected, operational position.

Each hydraulic ram 35 is pivotally connected at one end thereof to the respective side wall 16 of the carriage 14 by a pivot connection 37 and at its other end to a respective side of the support tower 12 by a pivot connection 38.

FIGS. 4 and 5 show the support tower in its raised position.

Upon contraction of the hydraulic rams 35 to lower the support tower by downward pivotation about the common horizontal axis of the pivots, with the carriage 14 in its forward, retracted position, the support tower 12 becomes substantially horizontally disposed, as illustrated in FIG. 6. In this lowermost position, the support tower 12 can be secured relative to the trailer by any suitable means for transportation and/or storage.

The carriage 14, and therewith the support tower 12 and its heating element 11, can, when required, be biased rearwardly for movement rearwardly from the trailer 15 from the retracted position in which the carriage 14 is shown in FIGS. 1 to 5 to a rearwardly extended position, in which the rear end of the carriage 14 is displaced rearwardly of the rear end of the trailer 15, by means of a counterweight 47.

Figure 10:
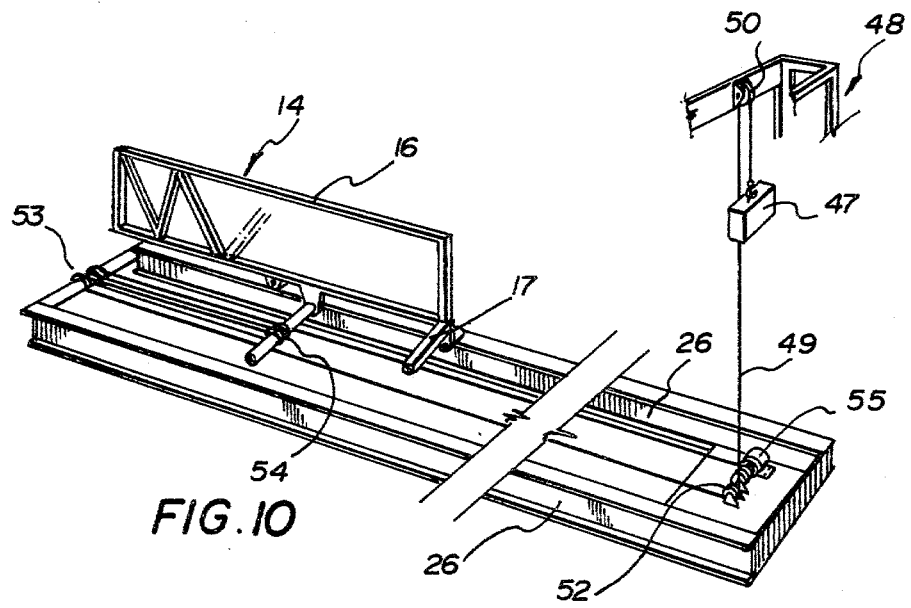
FIG. 10 shows a broken-away view, in perspective, of a counterweight arrangement.

When in use, the counterweight 47 is suspended within a counterweight support tower, indicated generally by reference numeral 48, by means of a cable 49 (FIG. 10).

The cable 49 extends upwardly from the counterweight 47 to partially wrap a pulley 50, which is freely rotatably mounted at the upper end of the counterweight support tower 48. From the pulley 50, the cable 49 extends downwardly through the counterweight support tower 48 to a lower pulley 52 freely rotatably mounted on the front end of the trailer 15. After being deflected around approximately right angle at the pulley 52, the cable 49 extends rearwardly along substantially the entire length of the trailer 15, between the I-beams 26, then repeatedly around pulleys 53 rotatably mounted at the rear end of the trailer 15 and pulleys 54 rotatably mounted on the carriage 14.

From the pulleys 54, the cable 49 extends to an electric winch 55 mounted on the front end of the trailer 15.

The counterweight support tower 48 is supported by means of pivot connections 58 at opposite sides of the front end of the trailer 15, and a hydraulic ram 59, which is pivotally connected at opposite ends thereto to the trailer 15 and the counterweight support tower 48, is provided for raising and lowering the counterweight support tower 48 between a vertical, erected, operational position, in which the counterweight support tower 48 is shown in FIGS. 1 to 4, and a collapsed, lowered position, in which the counterweight support tower 48 is supported on the trailer 15 for transportation thereby as shown in FIGS. 5 and 6.

FIG. 6 shows the counterweight support tower 48 in its erected position. To prepare the trailer for transportation, the counterweight support tower 48 is firstly lowered by retraction of the ram 59 into the horizontal position in which it is shown in FIG. 5. The heating element support tower 12 can then be brought down into its lowered position, as described above and illustrated in FIG. 6, so that it extends horizontally over the lowered counterweight support tower 48.

The trailer 15 has, at each side thereof, a pair of ground engagement wheels 60, which can be raised or lowered relative to the trailer 15 by means of an adjustable suspension comprising a pair of bell crank levers 61. A pair of hydraulic rams 62 are pivotally connected to the respective I-beam 26 and to one end of the respective bell crank levers 61, and the other ends of the bell crank levers 61 are pivotally connected to the joined lower ends of a pair of struts 63 depending from the underside of the trailer 15. The bell crank levers 61 are operatively connected, intermediate their ends, to the wheels 60 so that, on actuation of the hydraulic rams 62, the wheels 60 are raised or lowered. In FIG. 2, the wheels 60 are shown in full lines in their raised positions, and in broken lines in their lowered positions.

The trailer 15 is also provided with hydraulically actuatable support legs 65 for stabilizing the trailer 15 when the sulphur melting apparatus is in use.

Figure 9:
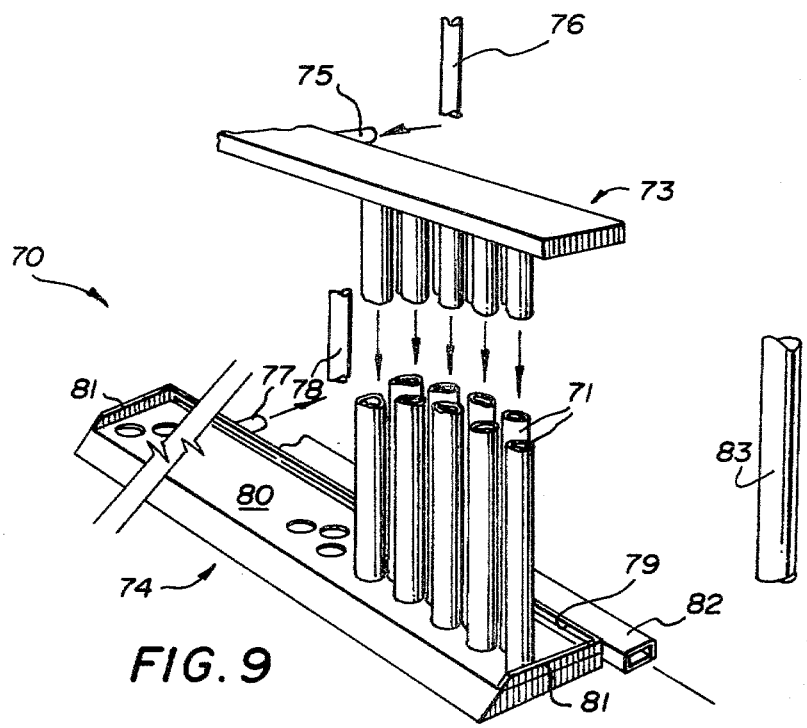
FIG. 9 shows a broken-away view in perspective of part of the heating element.

The heater element 11 comprises four heater sections, one of which is illustrated in FIG. 9 and indicated generally by reference numeral 70.

Each heater section 70 comprises a plurality of spaced vertical pipes 71, which have a length of ten feet and are arranged in a front row and a rear row with those of the rear row behind the gaps between those of the front row.

The pipes 71 communicate at opposite ends thereof with the hollow interiors of upper and lower headers 73 and 74. The upper header 73 has a stream inlet pipe 75 for supplying steam thereto from a vertical steam supply pipe 76, which supplies steam to each of the heater sections 70. The lower header 74 communicates through an outlet pipe 77 with a vertical discharge pipe 78, which is similarly connected to the lower header of each of the other heater sections 70.

The lower header 74 has a flat top surface 80 which is rearwardly inclined and provided with upstanding side walls 81, so that molten sulphur melted by the pipes 71 when the apparatus is in use will flow to the rear of the surface 80, and thence into a collection pipe 82, through any suitable opening 79 in the wall of the pipe 82, which extends horizontally along the rear of the lower header. The collection pipe 82 communicates with a vertical discharge pipe 83, which is common to all of the heater sections 70 and is arranged, in use, to discharge the molten sulphur downwardly into a trough or the like (not shown).

Figure 11:
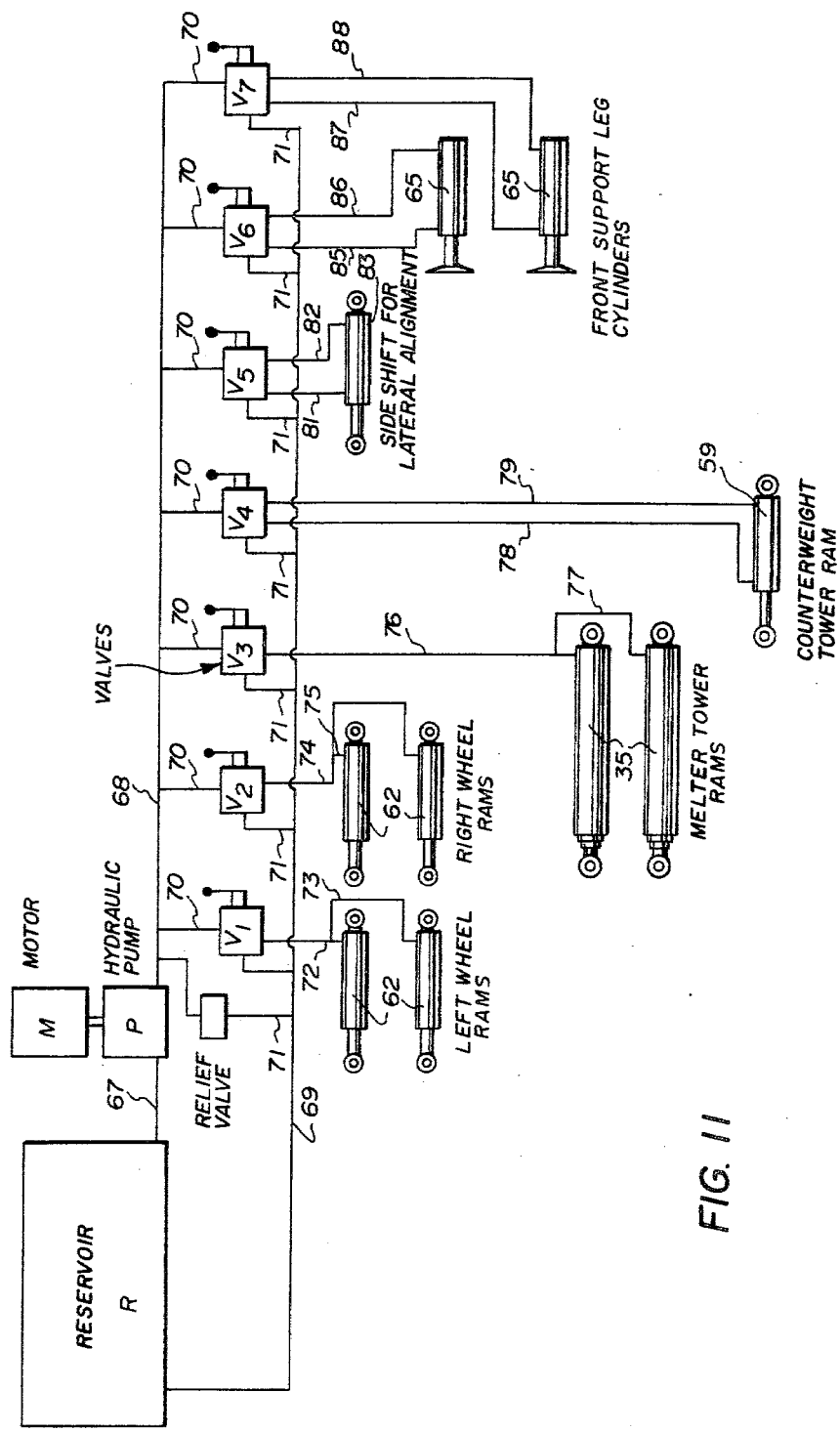
FIG. 11 shows the hydraulic control circuit of the apparatus.

Referring now to the hydraulic control circuit illustrated in FIG. 11, it will be seen that this circuit has a reservoir R for containing a supply of hydraulic fluid and a hydraulic pump P driven by a motor M and having a pump inlet connected by hydraulic line 67 to the reservoir R.

Hydraulic lines 68 and 69 are connected to the outlet of the hydraulic pump P and the inlet of the reservoir R, respectively, and a plurality of manually actuatable control valves $V_1$ to $V_7$ are connected in parallel across the hydraulic lines 68 and 69 by hydraulic lines 70 and 71.

Valves $V_1$ and $V_2$ have outlets connected by hydraulic lines 72–75 to the cylinders of the hydraulic rams 62 of the left and right wheels, respectively, of the trailer 15.

Valves $V_3$ and $V_4$ are connected by hydraulic lines 76–79 to the hydraulic rams 35 for raising and lowering the heating element support tower 12 and to the counterweight tower ram 59, respectively.

Valve $V_5$ is connected by hydraulic lines 81 and 82 to opposite ends of the cylinder of horizontal hydraulic ram 83, provided for moving the main frame of the trailer laterally on a slide attached to the front support legs 65 in order to accurately align the heating element 11 during operation of the apparatus.

Valves $V_6$ and $V_7$ are connected by hydraulic lines 85–88 to respective cylinders of the front support legs 65.

A pressure relief valve RV is connected in hydraulic line 89 across hydraulic lines 68 and 69.

The operation of the above-described apparatus is as follows.

To transport the apparatus to the vicinity of the sulphur block which is indicated by reference numeral 67 in FIG. 1, the trailer 15 is towed by a truck (not shown) with the heating element support tower 12 and the counterweight support tower 48 in their collapsed positions, in which they are illustrated in FIG. 6.

The trailer 15 is then backed towards the sulphur block 67 into an appropriate position, and the ground engagement wheels 60 are raised, and the support legs 65 are lowered, so that the trailer 15 is securely stabilized on the ground.

The hydraulic ram 35 is actuated to pivot the heating element support tower 12, and therewith the heating element 11, from its collapsed position on the trailer 15 to its upright, operational position.

The counterweight support tower 48 is then raised into its erected position by means of the hydraulic ram 59.

Steam supply pipes are then coupled to the headers of the heating element 11 to supply the steam thereto.

Using the electric winch 54, the counterweight 47 is raised in the counterweight support tower 48 to the position in which it is illustrated in FIG. 2.

With the apparatus thus ready for operation, the sulphur is melted by employing the weight of the counterweight 47 to bias or advance the carriage 14, and therewith the heating element 11, against the sulphur block 67, i.e. rearwardly of the trailer 15.

Heat applied to the sulphur block 67 from the heating element 11 melts the sulphur in the immediate vicinity of the heating element 11. More particularly, the lower headers 74 of each heater section 70 firstly melts its way into the sulphur block, being the first part of the apparatus to contact the block, and then acts as a seal while the vertical heater pipes 71 approach and melt the block, so that the melted sulphur runs down the pipes 71 for collection as hereinbefore described and is prevented from running forwardly by the sealing of the block to the projecting forward edge of the lower header 74.

The molten sulphur which flows out from the discharge pipe 83 may be collected in a collection pit and subsequently pumped from the collecting pit for transportation or processing, when desired.

If necessary, the hydraulic ram 83 can be actuated to laterally adjust the rails 20 and thus the carriage 14 by laterally displacing the forward end of the trailer to correctly align the heating element support tower 12 relative to the sulphur block. In this way, a cut of uniform thickness can be ensured.

Wheels 90 provided at the bottom of the support tower 12 and in engagement with the ground when the support tower 12 is erected serve to compensate any torsional loads that may be encountered as the heating element 11 moves rearwardly.

The use of the relatively small force of the counterweight 47 for biasing the heating element 11 towards the sulphur block has the advantage that, if the heating element 11 meets a foreign object in the sulphur block 67, which obstructs the advance of the heating element 11 through the sulphur block 67, no reaction forces, such as would be produced by the use of a hydraulic ram for displacing the heating element 11, are exerted on the apparatus.

The use of multiple pulleys 53 and 54 provides a mechanical advantage so that the horizontal force biasing the carriage 14 rearwardly is a multiple of the weight of the counterweight 47. For example, if the counterweight weighs 3000 lbs. and the pulleys 53 and 54 provide a mechanical advantage of 6:1, a biasing force of 18,000 lbs. is applied to the carriage 14. Obviously, this biasing force can be varied by adding or removing weight from the counterweight and/or varying the number of pulleys 53 and 54 employed.

Limit switches (not shown) may be employed in the counterweight support tower for limiting the travel of the counterweight so that, in operation, the counterweight is raised by the winch until it actuates an upper one of the limit switches to thereby stop the winch. As the counterweight falls in response to melting of the sulphur, it eventually actuates a lower one of the limit switches to stop the descent of the counterweight.

After the heating element 11 has thus been displaced rearwardly of the trailer 15 by the maximum distance, i.e. when the carriage 14 has reached the limits of its rearward travel, the winch is reversed to lower the counterweight on the trailer and thus to take tension off the cable 49. The rails 20 are downwardly and forwardly inclined at one-half of one percent gradient to cause the carriage 14 to roll back to its starting position. The trailer 15 is then backed further towards the remaining unmelted portion of the sulphur block 17, and the winch is operated to raise the counterweight again.

The above-described apparatus not only has the advantage of mobility but also provides safety for the operating personnel, who operate with the apparatus at ground level and are not required to work at a position close to the molten sulphur and the heating element. Since the flow of molten sulphur is vertically downward and since the sulphur is collected at the bottom of each heater section 70, sulphur losses through fissures in the block are minimized and high volumes and velocities of sulphur flow are avoided. Energy efficiency is obtained as heat is transferred to the block through a minimum thickness of molten sulphur. The apparatus is readily adaptable to sulphur blocks of different heights and requires minimal permanent plant adaptation, since the steam and electrical power requirements are normally readily available at all block locations from ordinary plant operation. The use of the present apparatus is not labour intensive and does not require extraordinary skill and judgment. The operation of the apparatus may be continuous or intermittent, as required, since the apparatus is simple to start up or close down.

We claim:

1. Apparatus for melting block sulphur, comprising:
   a heating element for applying heat to the sulphur;
   said heating element comprising an array of mutually spaced and parallel pipes, inlet means for directing a flow of steam through said pipes and outlet means for the discharge of steam and condensate from said pipes;
   means for supporting said heating element in an at least approximately upright disposition; and
   means for advancing said heating element in said disposition and in a direction at least approximately parallel to the ground towards the sulphur.

2. Apparatus as claimed in claim 1, further comprising a chassis carrying said heating element, said supporting means including means for collapsing said heating element from its upright disposition into a substantially horizontal portion on said chassis for transportation.

3. Apparatus as claimed in claim 2, wherein said supporting means include means mounting said heating element for movement by said advancing means relative to said chassis.

4. Apparatus as claimed in claim 3, wherein said advancing means comprise a counterweight, a counterweight tower, a pulley on said counterweight tower, and a cable extending around said pulley from said counterweight to said mounting means.

5. Apparatus as claimed in claim 4, further comprising pivot means for pivotably connecting said counterweight tower to said chassis and hydraulic piston and cylinder means for pivotally raising said counterweight tower from a lowered position, in which said counterweight tower is collapsed onto said chassis for transportation, and a raised, operational position.

6. Apparatus as claimed in claim 2, wherein said supporting means further comprise pivot means for supporting said heating element for pivotation about an at least approximately horizontal axis and hydraulically extensible and retractable piston and cylinder means for pivotally raising and lowering said heating element about said axis.

7. Apparatus as claimed in claim 1, wherein said supporting means comprise means for raising said heating element from a collapsed, substantially horizontal position to the upright disposition.

8. Apparatus as claimed in claim 1, comprising a plurality of sulphur collection surfaces spaced apart along said heating element.

9. Apparatus as claimed in claim 8, wherein said sulphur collection surfaces are vertically spaced and downwardly and forwardly inclined when said heating element is in its upright disposition.

10. Apparatus for melting block sulphur, comprising:
    an elongate heating element for applying heat to the sulphur;
    said heating element comprising an array of mutually spaced and parallel pipes, inlet means for directing a flow of steam through said pipes and outlet means for the discharge of steam and condensate from said pipes;
    a carriage for movably carrying said heating element;
    means for supporting said heating element in an at least approximately upright disposition on said chassis;
    said supporting means including means for raising and lowering said heating element relative to said chassis between an erected position, in which said heating element is in its upright disposition, and a collapsed position, in which said heating element is in a lowered condition for transportation; and
    means for displacing said carriage and said heating element towards the sulphur in a direction at least approximately parallel to the ground.

11. Apparatus as claimed in claim 10, further comprising a plurality of sulphur collecting means spaced apart along said pipes for collecting sulphur melted by said pipes.

12. Apparatus as claimed in claim 11, wherein said sulphur collection means comprise headers projecting rearwardly from said pipes.

13. Apparatus as claimed in claim 10, further comprising rails guidingly supporting said carriage for movement by said supporting means.

14. Apparatus as claimed in claim 13, further comprising a trailer for supporting said carriage, said supporting means and said displacing means, said rails being provided on said trailer.

15. Apparatus as claimed in claim 14, further comprising means for laterally adjusting the forward ends of said rails relative to the ground.

16. Apparatus as claimed in claim 14, wherein said carriage is horizontally elongate, roller means are on said carriage for rolling engagement with said rails, whereby said carriage is movable rearwardly by said displacing means into a position in which the rear end of said carriage is rearwardly cantilevered beyond the rear end of said trailer, and means are provided for pivotally connecting said heating element to the rear end of said carriage.

17. Apparatus as claimed in claim 16, wherein said rails comprise horizontal portions presenting running surfaces on the tops and undersides thereof, and said roller means comprise pairs of rollers at opposite sides of said carriage, each of said roller pairs comprising an upper roller and a lower roller in rolling engagement with the top running surface and the underside running surface, respectively, of a respective one of said rails.

18. Apparatus as claimed in claim 16, wherein said connecting means comprise means pivotally connecting said heating element to the rear end of said carriage for pivotation of said heating element about a horizontal axis relative to said carriage.

19. Apparatus as claimed in claim 16, wherein said displacing means comprise a counterweight, a cable connecting said counterweight to said carriage, a collapsible counterweight support tower and a pulley rotatably mounted on said tower, said cable extending around said pulley for suspending said counterweight from said tower.

20. Apparatus as claimed in claim 19, further comprising pulley means wrapped by said cable for providing a mechanical advantage.

* * * * *